United States Patent
Cowgill et al.

(10) Patent No.: US 9,127,601 B2
(45) Date of Patent: Sep. 8, 2015

(54) CYLINDER TO CYLINDER BALANCING USING FULLY FLEXIBLE VALVE ACTUATION AND CYLINDER PRESSURE FEEDBACK

(76) Inventors: Joel Cowgill, White Lake, MI (US); Ben W. Moscherosch, Waterford, MI (US)

(*) Notice: Subject to any disclaimer, the term of this patent is extended or adjusted under 35 U.S.C. 154(b) by 522 days.

(21) Appl. No.: 13/568,624

(22) Filed: Aug. 7, 2012

(65) Prior Publication Data

US 2014/0046571 A1    Feb. 13, 2014

(51) Int. Cl.
| | |
|---|---|
| G06F 19/00 | (2011.01) |
| G06G 7/70 | (2006.01) |
| F02D 35/02 | (2006.01) |
| F02D 13/02 | (2006.01) |
| F02D 41/00 | (2006.01) |

(52) U.S. Cl.
CPC .......... *F02D 35/023* (2013.01); *F02D 13/0203* (2013.01); *F02D 13/0207* (2013.01); *F02D 41/0085* (2013.01); *F02D 2041/001* (2013.01); *Y02T 10/18* (2013.01)

(58) Field of Classification Search
CPC .............. F01L 2800/08; F01L 2810/05; F01L 2820/043; F01L 2013/115; F02D 13/02; F02D 13/0203; F02D 13/0207; F02D 13/0223; F02D 13/0226; F02D 13/0234; F02D 13/0296; F02D 35/023; F02D 41/0002; F02D 2041/001; F02D 41/008; F02D 41/0085
See application file for complete search history.

(56) References Cited

U.S. PATENT DOCUMENTS

| | | |
|---|---|---|
| 4,466,405 A | 8/1984 | Hattori et al. |
| 5,107,814 A * | 4/1992 | Nishiyama et al. ........... 123/435 |
| 5,749,334 A | 5/1998 | Oda et al. |
| 6,101,998 A | 8/2000 | Tamura et al. |
| 6,681,739 B2 | 1/2004 | Mamiya et al. |
| 6,684,151 B1 | 1/2004 | Ring |
| 6,792,924 B2 | 9/2004 | Aoyama et al. |
| 6,971,350 B2 | 12/2005 | Akasaka et al. |
| 7,024,304 B2 | 4/2006 | Fukasawa et al. |
| 7,124,020 B2 | 10/2006 | Vermonet et al. |
| 7,506,535 B2 * | 3/2009 | Kang .......................... 73/114.16 |
| 7,761,223 B2 | 7/2010 | Wang et al. |
| 7,848,910 B2 | 12/2010 | Schantl et al. |
| 8,033,267 B2 | 10/2011 | Nakagawa et al. |
| 8,600,644 B2 | 12/2013 | Verner et al. |
| 2004/0025838 A1 * | 2/2004 | Fuwa et al. .............. 123/406.41 |
| 2005/0022789 A1 | 2/2005 | Palma et al. |

(Continued)

FOREIGN PATENT DOCUMENTS

CN          1181800 A     5/1998

*Primary Examiner* — Erick Solis
*Assistant Examiner* — Anthony L Bacon

(57) ABSTRACT

A control system for an engine includes an valve actuator, a cylinder pressure module, and a valve control module. The valve actuator opens a valve of a cylinder at a first target opening timing during a first combustion cycle of the cylinder. The cylinder pressure module receives a cylinder pressure measured by a cylinder pressure sensor of the cylinder and, at a predetermined crankshaft angle after the valve opens during the first combustion cycle, sets a valve opening pressure equal to the cylinder pressure. The valve control module receives a reference cylinder pressure and generates a second target opening timing for a second combustion cycle of the cylinder based on the valve opening pressure and the reference cylinder pressure. The second combustion cycle is after the first combustion cycle. During the second combustion cycle, the valve actuator opens the valve at the second target opening timing.

20 Claims, 4 Drawing Sheets

(56) References Cited

U.S. PATENT DOCUMENTS

| | | |
|---|---|---|
| 2006/0293829 A1 | 12/2006 | Cornwell et al. |
| 2007/0056560 A1* | 3/2007 | Trask et al. .................. 123/435 |
| 2007/0288213 A1 | 12/2007 | Schantl et al. |
| 2008/0201060 A1* | 8/2008 | Nagai .......................... 701/103 |
| 2009/0007564 A1* | 1/2009 | Suzuki et al. .................. 60/602 |
| 2011/0303190 A1 | 12/2011 | Yasuda |
| 2012/0277970 A1 | 11/2012 | Rayl |
| 2012/0277972 A1 | 11/2012 | Rayl |

* cited by examiner

CYLINDER TO CYLINDER BALANCING USING FULLY FLEXIBLE VALVE ACTUATION AND CYLINDER PRESSURE FEEDBACK

STATEMENT OF GOVERNMENT RIGHTS

Portions or all of this invention may have been produced pursuant to U.S. Government Contract No. DE-FC26-05NT42415. The U.S. Government may therefore have certain rights in this invention.

FIELD

The present disclosure relates to internal combustion engines and more particularly to valve control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or intake valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

In an example, a control system for an engine includes an intake valve actuator, a cylinder pressure module, and a valve control module. The intake valve actuator opens an intake valve of a cylinder at a first target opening timing during a first combustion cycle of the cylinder. The cylinder pressure module receives a cylinder pressure measured by a cylinder pressure sensor of the cylinder and, at a predetermined crankshaft angle after the intake valve opens during the first combustion cycle, sets a valve opening pressure equal to the cylinder pressure. The valve control module receives a reference cylinder pressure and generates a second target opening timing for a second combustion cycle of the cylinder based on the valve opening pressure and the reference cylinder pressure. The second combustion cycle is after the first combustion cycle. During the second combustion cycle, the intake valve actuator opens the intake valve at the second target opening timing.

In an example, a control system for an engine includes an exhaust valve actuator, a cylinder pressure module, and a valve control module. The exhaust valve actuator opens an exhaust valve of a cylinder at a first target opening timing during a first combustion cycle of the cylinder. The cylinder pressure module receives a cylinder pressure measured by a cylinder pressure sensor of the cylinder and, at a predetermined crankshaft angle after the exhaust valve opens during the first combustion cycle, sets a valve opening pressure equal to the cylinder pressure. The valve control module receives a reference cylinder pressure and generates a second target opening timing for a second combustion cycle of the cylinder based on the valve opening pressure and the reference cylinder pressure. The second combustion cycle is after the first combustion cycle. During the second combustion cycle, the exhaust valve actuator opens the exhaust valve at the second target opening timing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls opening and closing of intake valves and exhaust valves of an engine. Using a fully flexible valve actuation (FFVA) system, the ECM can control opening and closing of each intake and exhaust valve independently of each other intake and exhaust valve.

A cylinder pressure sensor is provided for each cylinder of the engine. The ECM samples the cylinder pressure measured by a cylinder pressure sensor after each intake valve opening of the cylinder, each intake valve closing of the cylinder, each exhaust valve opening of the cylinder, and each exhaust valve closing of the cylinder. The ECM similarly samples the cylinder pressure of each other cylinder after each intake valve opening, intake valve closing, exhaust valve opening, and exhaust valve closing.

One of the cylinders of the engine may be selected as a reference cylinder. For example, a first cylinder in a predetermined firing order of the cylinders may be selected as the reference cylinder. The ECM may set a cylinder's intake valve opening timing, intake valve closing timing, exhaust valve opening timing, and/or exhaust valve closing timing to adjust that cylinder's pressures toward or to the reference cylinder's pressures, respectively. The ECM may perform the adjustment for each of the cylinders to balance each of the cylinders' pressures with the reference cylinder's pressures, respectively. This may decrease one or more of noise, vibration, and harshness (NVH) experienced, provide better cylinder-to-cylinder air/fuel imbalance, and/or provide one or more other benefits.

Figure 1:
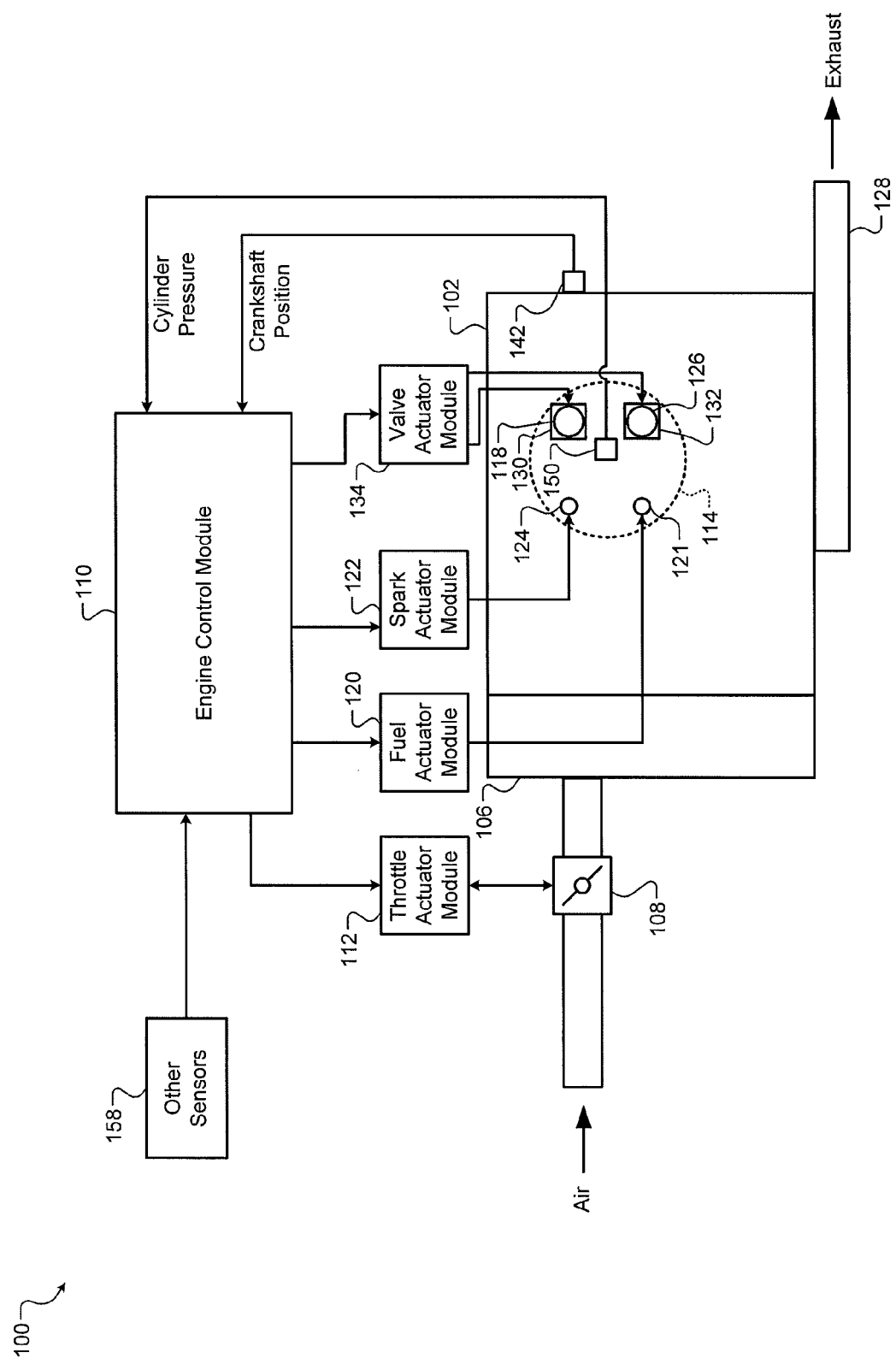
FIG. 1 is a functional block diagram of an example engine system according to the present application.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine that operates or selectively operates using homogenous charge compression ignition (HCCI). One or more electric motors and/or motor generator units (MGUs) may be used with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through one or more intake valves, such as intake valve 118. One or more intake valves may be provided with each cylinder. Timing of opening and closing of the intake valve(s) may affect flow into and out of the cylinder.

The ECM 110 controls a fuel actuator module 120, and the fuel actuator module 120 controls fuel injection (e.g., amount and timing) by a fuel injector 121. The fuel injector 121 injects fuel into the cylinder 114. Fuel is provided to the fuel injector 121 by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel, for example, for direct injection into the cylinders of the engine 102. A fuel injector may be provided for each cylinder.

The injected fuel mixes with air and creates an air/fuel mixture in the cylinder 114. A piston (not shown) within the cylinder 114 compresses the air/fuel mixture. Based upon a signal from the ECM 110, a spark actuator module 122 may energize a spark plug 124 in the cylinder 114. Spark generated by the spark plug 124 ignites the air/fuel mixture during spark ignition (SI) operation of the engine 102. The timing of the spark may be specified relative to the time when the piston is at its topmost position, referred to as top dead center (TDC). During homogenous charge compression ignition (HCCI) operation of the engine 102, heat generated by compression causes ignition. The ECM 110 may control whether the engine 102 operates using SI or HCCI.

Combustion of the air/fuel mixture drives the piston away from the TDC position, and the piston drives rotation of a crankshaft (not shown). After reaching a bottom most position, referred to as bottom dead center (BDC), the piston begins moving toward the TDC position again and expels contents of the cylinder 114 through one or more exhaust valves, such as exhaust valve 126. One or more exhaust valves may be provided for each cylinder. The byproducts of combustion are exhausted from the vehicle via an exhaust system 128. Timing of opening and closing of the exhaust valve(s) may also affect flow into and out of the cylinder.

An intake valve actuator 130 controls actuation of the intake valve 118. An exhaust valve actuator 132 controls actuation of the exhaust valve 126. A valve actuator module 134 controls the intake and exhaust valve actuators 130 and 132 based on signals from the ECM 110.

The intake and exhaust valve actuators 130 and 132 control opening and closing of the intake and exhaust valves 118 and 126, respectively. The intake and exhaust valve actuators 130 and 132 are fully flexible valve actuators. The intake and exhaust valve actuators 130 and 132 may include, for example, electro-hydraulic actuators, electro-mechanical actuators, or another suitable type of fully flexible valve actuator. Fully flexible valve actuators may be camshaft based valve actuators or camless valve actuators. One fully flexible valve actuator may be provided for each intake valve of the engine 102, and one fully flexible valve actuator may be provided for each exhaust valve of the engine 102.

Fully flexible intake and exhaust valve actuators enable actuation of each intake valve and exhaust valve of the engine 102 to be controlled independently of each other valve. The intake and exhaust valve actuators provide what may be referred to as fully flexible valve actuation (FFVA). Using FFVA, the flow of gasses into and out of each cylinder can be individually regulated (via control of intake and exhaust valve opening and closing) to control the flow into and out of the cylinders and, therefore, the combustion conditions within each cylinder.

A crankshaft position sensor 142 monitors rotation of the crankshaft and generates a crankshaft position signal based on the rotation of the crankshaft. For example only, the crankshaft position sensor 142 may include a variable reluctance (VR) sensor or another suitable type of crankshaft position sensor. The crankshaft position signal may include a pulse train. A pulse may be generated in the crankshaft position signal as a tooth of a P-toothed wheel (not shown) that rotates with the crankshaft passes the crankshaft position sensor 142, where P is an integer greater than one. Accordingly, each pulse corresponds to an angular rotation of the crankshaft by an amount approximately equal to 360° divided by P teeth. The P-toothed wheel may also include a gap of one or more missing teeth, and the gap may be used as an indicator of one complete revolution of the crankshaft (i.e., 360° of crankshaft rotation).

A cylinder pressure sensor 150 measures pressure within the cylinder 114 and generates a cylinder pressure signal based on the pressure. A cylinder pressure sensor is provided for each cylinder of the engine 102. One or more other sensors 158 may also be provided. For example, the other sensors 158 may include a mass air flowrate (MAF) sensor, a manifold absolute pressure (MAP) sensor, an intake air temperature (IAT) sensor, a coolant temperature sensor, and/or one or more other suitable sensors.

Figure 2:
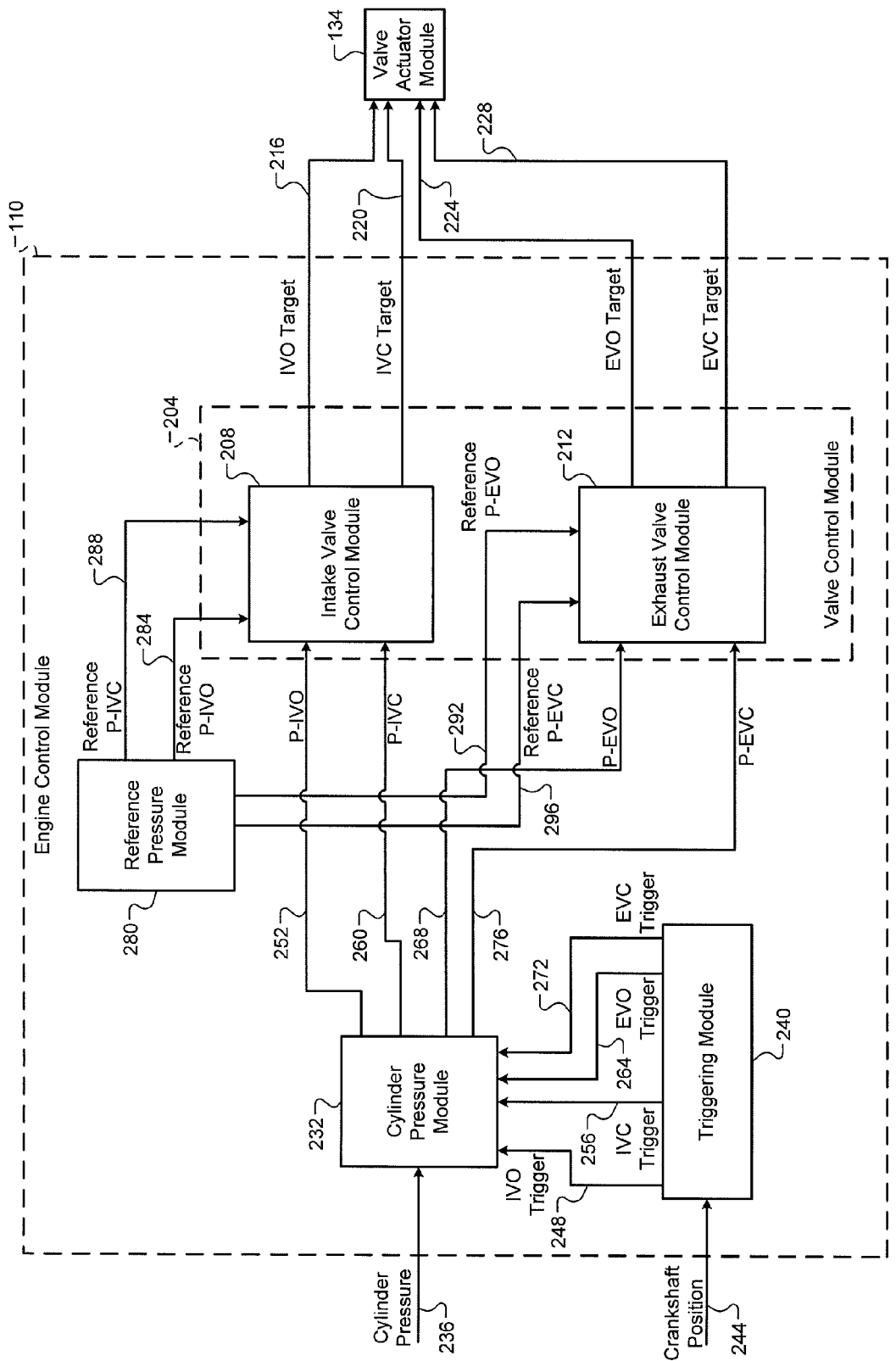
FIG. 2 is a functional block diagram of an example valve actuation system according to the present application.

Referring now to FIG. 2, a functional block diagram of an example valve control system including a portion of the ECM 110 is presented. A valve control module 204 may include an intake valve control module 208 and an exhaust valve control module 212. The intake valve control module 208 generates a target opening timing and a target closing timing for the intake valve 118. The target opening timing and the target closing timing for the intake valve 118 will be referred to as target intake valve opening (IVO) timing 216 and target intake valve closing (IVC) timing 220, respectively. Generation of the target intake valve opening and closing timings 216 and 220 is discussed further below. During the next combustion cycle of the cylinder, the valve actuator module 134 opens the intake valve 118 at the target IVO timing 216 and closes the intake valve 118 at the target IVC timing 220. An intake valve opening may refer to when the intake valve begins to open. An intake valve closing may refer to when the intake valve becomes closed.

The exhaust valve control module 212 generates a target opening timing and a target closing timing for the exhaust valve 126. The target opening timing and the target closing timing for the exhaust valve 126 will be referred to as target exhaust valve opening (EVO) timing 224 and target exhaust valve closing (EVC) timing 228, respectively. Generation of the target exhaust valve opening and closing timings 224 and 228 is also discussed further below. During the next combustion cycle of the cylinder, the valve actuator module 134 opens the exhaust valve 126 at the target EVO timing 224 and closes the exhaust valve 126 at the target EVC timing 228. An exhaust valve opening may refer to when the exhaust valve begins to open. An exhaust valve closing may refer to when the exhaust valve becomes closed.

A cylinder pressure module 232 receives a cylinder pressure 236 measured using the cylinder pressure sensor 150. The cylinder pressure module 232 selectively sets a plurality of cylinder pressures for a present combustion cycle of the cylinder based on the cylinder pressure 236.

The cylinder pressure module 232 sets the cylinder pressures when triggered by a triggering module 240. The triggering module 240 triggers the cylinder pressure module 232 based on a crankshaft position 244 measured using the crankshaft position sensor 142. The triggering module 240 triggers the cylinder pressure module 232 after each opening and after each closing of the intake valve 118. The triggering module 240 also triggers the cylinder pressure module 232 after each opening and after each closing of the exhaust valve 126.

The triggering module 240 generates an intake valve opening (IVO) trigger 248 after each opening timing of the intake valve 118. For example only, the triggering module 240 may generate the IVO trigger 248 a predetermined rotational distance (angle) after the target IVO timing 216 set for the present combustion cycle of the cylinder 114. For another example only, the triggering module 240 may generate the IVO trigger 248 when the crankshaft position 244 reaches a predetermined intake opening angle during the present combustion cycle of the cylinder 114. The predetermined intake opening angle may be, for example, approximately 5-10 crank angle degrees (CAD) after the TDC position of the exhaust stroke or another suitable angle. The predetermined intake closing angle may be a fixed, calibrated value or may be a variable value determined, for example, based on engine speed and engine load. In response to the generation of the IVO trigger 248, the cylinder pressure module 232 sets an IVO pressure 252 (P-IVO) equal to the cylinder pressure 236.

The triggering module 240 generates an intake valve closing (IVC) trigger 256 after each closing timing of the intake valve 118. For example only, the triggering module 240 may generate the IVC trigger 256 a predetermined rotational distance after the target IVC timing 220 set for the present combustion cycle of the cylinder 114. For another example only, the triggering module 240 may generate the IVC trigger 256 when the crankshaft position 244 reaches a predetermined intake closing angle during the present combustion cycle of the cylinder 114. The predetermined intake closing angle may be, for example, approximately 90 CAD after the BDC position of the intake stroke or another suitable angle. The predetermined intake closing angle may be a fixed, calibrated value or may be a variable value determined, for example, based on engine speed and engine load. In response to the generation of the IVC trigger 256, the cylinder pressure module 232 sets an IVC pressure 260 (P-IVC) equal to the cylinder pressure 236.

The triggering module 240 generates an exhaust valve opening (EVO) trigger 264 after each opening timing of the exhaust valve 126. For example only, the triggering module 240 may generate the EVO trigger 264 at a predetermined rotational distance after the target EVO timing 224 set for the present combustion cycle of the cylinder 114. For another example only, the triggering module 240 may generate the EVO trigger 264 when the crankshaft position 244, for example, reaches a predetermined exhaust opening angle during the present combustion cycle of the cylinder 114. The predetermined exhaust opening angle may be, for example, approximately the BDC position of the expansion stroke of a combustion cycle or another suitable angle. The predetermined exhaust opening angle may be a fixed, calibrated value or may be a variable value determined, for example, based on engine speed and engine load. In response to the generation of the EVO trigger 264, the cylinder pressure module 232 sets an EVO pressure 268 (P-EVO) equal to the cylinder pressure 236.

The triggering module 240 generates an exhaust valve closing (EVC) trigger 272 after each closing timing of the exhaust valve 126. For example only, the triggering module 240 may generate the EVC trigger 272 a predetermined rotational distance after the target EVC timing 228 set for the present combustion cycle of the cylinder 114. For another example only, the triggering module 240 may generate the EVC trigger 272 when the crankshaft position 244 reaches a predetermined exhaust closing angle during the present combustion cycle of the cylinder 114. The predetermined exhaust closing angle may be, for example, approximately 5-10 CAD before the TDC position of the exhaust stroke of a combustion cycle or another suitable angle. The predetermined exhaust closing angle may be a fixed, calibrated value or may be a variable value determined, for example, based on engine speed and engine load. In response to the generation of the EVC trigger 272, the cylinder pressure module 232 sets an EVC pressure 276 (P-IVC) equal to the cylinder pressure 236.

As stated above, a cylinder pressure sensor is provided with each cylinder of the engine 102. Thus, an IVO pressure, an IVC pressure, an EVO pressure, and an EVC pressure, like the IVO pressure 252, the IVC pressure 260, the EVO pressure 268, and the EVC pressure 276, respectively, can be obtained for each cylinder and each combustion cycle. The pressures of other cylinders may be provided by the cylinder pressure module 232 in response to triggers generated by the triggering module 240 for the other cylinders, respectively, or one or more other modules may provide the pressures. In various implementations, one cylinder pressure module and one triggering module may be provided for each cylinder.

One of the cylinders of the engine 102 may be selected as a reference cylinder. For example, a first cylinder in a predetermined firing order of the cylinders may be selected as a reference cylinder. A reference pressure module 280 outputs the reference cylinder's IVO pressure, IVC pressure, EVO pressure, and EVC pressure a reference IVO pressure 284, a reference IVC pressure 288, a reference EVO pressure 292, and a reference EVC pressure 296, respectively. For example, if the cylinder 114 is the reference cylinder, the reference pressure module 280 outputs the IVO pressure 252, the IVC pressure 260, the EVO pressure 268, and the EVC pressure 276 as the reference IVO pressure 284, the reference IVC pressure 288, the reference EVO pressure 292, and the reference EVC pressure 296, respectively.

Referring back to the intake and exhaust valve control modules 208 and 212, the intake valve control module 208 determines a desired IVO timing and a desired IVC timing (not shown). The exhaust valve control module 212 determines a desired EVO timing and a desired EVC timing (not shown). The desired IVO timing, the desired IVC timing, the desired EVO timing, and the desired EVC timing may be determined as a function of, for example, engine speed, engine load, and/or one or more other suitable parameters.

The intake valve control module 208 sets the target IVO timing 216 to adjust the IVO pressure 252 of the next control loop equal to the reference IVO pressure 284. The intake valve control module 208 may determine the target IVO timing 216 based on the desired IVO timing, the reference IVO pressure 284, and the IVO pressure 252. For example, the intake valve control module 208 may determine a first timing adjustment as a function of a difference between the reference IVO pressure 284 and the IVO pressure 252 and determine the target IVO timing 216 as a function of the first timing adjustment (e.g., in CAD) and the desired IVO timing. For example only, the intake valve control module 208 may set the target IVO timing 216 equal to a sum of the first timing adjustment and the desired IVO timing. The intake valve control module 208 may determine the first timing adjustment based on the difference, for example, using proportional (P) control, proportional integral (PI) control, proportional integral derivative (PID) control, or another suitable type of feedback control.

The intake valve control module 208 sets the target IVC timing 220 to adjust the IVC pressure 260 of the next control loop equal to the reference IVC pressure 288. The intake valve control module 208 may determine the target IVC timing 220 based on the desired IVC timing, the reference IVC pressure 288, and the IVC pressure 260. For example, the intake valve control module 208 may determine a second timing adjustment as a function of a difference between the reference IVC pressure 288 and the IVC pressure 260 and determine the target IVC timing 220 as a function of the second timing adjustment (e.g., in CAD) and the desired IVC timing. For example only, the intake valve control module 208 may set the target IVC timing 220 equal to a sum of the second timing adjustment and the desired IVC timing. The intake valve control module 208 may determine the second timing adjustment based on the difference, for example, using P control, PI control, PID control, or another suitable type of feedback control.

The exhaust valve control module 212 sets the target EVO timing 224 to adjust the EVO pressure 268 of the next control loop equal to the reference EVO pressure 292. The exhaust valve control module 212 may determine the target EVO timing 224 based on the desired EVO timing, the reference EVO pressure 292, and the EVO pressure 268. For example, the exhaust valve control module 212 may determine a third timing adjustment as a function of a difference between the reference EVO pressure 292 and the EVO pressure 268 and determine the target EVO timing 224 as a function of the third timing adjustment (e.g., in CAD) and the desired EVO timing. For example only, the exhaust valve control module 212 may set the target EVO timing 224 equal to a sum of the third timing adjustment and the desired EVO timing. The exhaust valve control module 212 may determine the third timing adjustment based on the difference, for example, P control, PI control, PID control, or another suitable type of feedback control.

The exhaust valve control module 212 sets the target EVC timing 228 to adjust the EVC pressure 276 of the next control loop equal to the reference EVC pressure 296. The exhaust valve control module 212 may determine the target EVC timing 228 based on the desired EVC timing, the reference EVC pressure 296, and the EVC pressure 276. For example, the exhaust valve control module 212 may determine a fourth timing adjustment as a function of a difference between the reference EVC pressure 296 and the EVC pressure 276 and determine the target EVC timing 228 as a function of the fourth timing adjustment (e.g., in CAD) and the desired EVC timing. For example only, the exhaust valve control module 212 may set the target EVC timing 228 equal to a sum of the fourth timing adjustment and the desired EVC timing. The exhaust valve control module 212 may determine the fourth timing adjustment based on the difference, for example, using P control, PI control, PID control, or another suitable type of feedback control.

Setting the target IVO, IVC, EVO, and EVC timings 216, 220, 224, and 228 of the cylinder to adjust the IVO, IVC, EVO, and EVC pressures 252, 260, 268, and 276 to the reference IVO, IVC, EVO, and EVC pressures 284, 288, 292, and 296, respectively, may balance torque production of the cylinders. This setting of the target timings may equalize indicated mean effective pressure (IMEP) and pumping mean effective pressure (PMEP) of the cylinders, thereby equalizing net mean effective pressure (NMEP) of the cylinders. More specifically, airflow into and exhaust flow out of each cylinder may be equalized. The balancing of the cylinders may provide better air fuel imbalance (AFIM) across the cylinders and reduce noise, vibration, and/or harshness (NVH) experienced by users of the vehicle.

Figure 3:
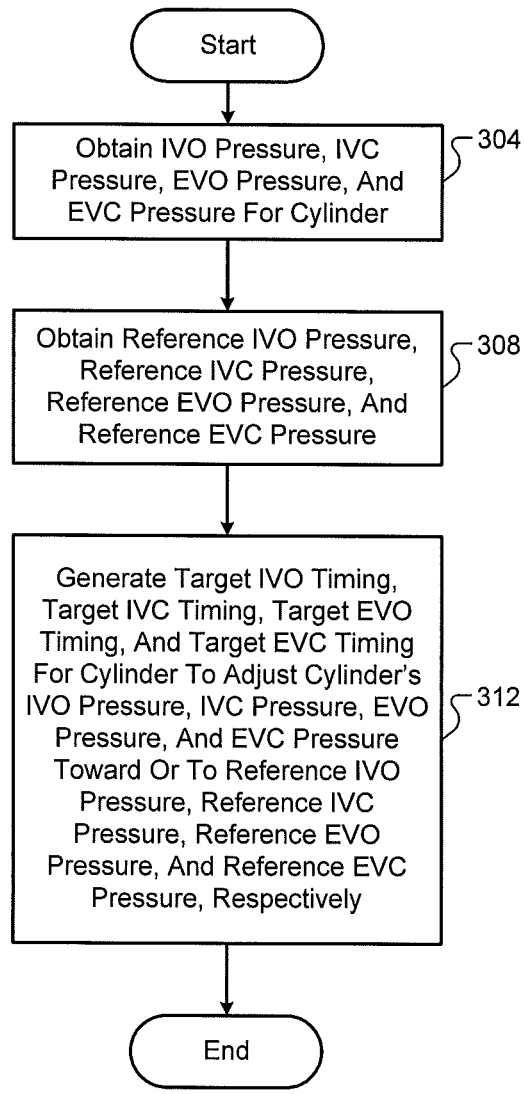
FIG. 3 is a flowchart depicting an example method of controlling intake and exhaust valve opening and closing timing using fully flexible valve actuation according to the present application.

Referring now to FIG. 3, a flowchart depicting an example method of controlling intake and exhaust valve opening and closing timing using fully flexible valve actuation is presented. Control may begin with 304 where control obtains the IVO pressure, the IVC pressure, the EVO pressure, and the EVC pressure for a cylinder. For example, control may obtain the IVO pressure 252, the IVC pressure 260, the EVO pressure 268, and the EVC pressure 276 for the cylinder 114. While FIG. 3 will be discussed in conjunction with the cylinder 114, control may perform the method of FIG. 3 for each other cylinder and for each combustion cycle.

Control obtains the IVO pressure 252 from a measurement of the cylinder pressure sensor 150 taken after the IVO timing of the cylinder 114. Control obtains the IVC pressure 260 from a measurement of the cylinder pressure sensor 150 taken after the IVC timing of the cylinder 114. Control obtains the EVO pressure 268 from a measurement of the cylinder pressure sensor 150 taken after the EVO timing of the cylinder 114. Control obtains the EVC pressure 276 from a measurement of the cylinder pressure sensor 150 taken after the EVC timing of the cylinder 114.

At 308, control obtains the reference IVO pressure 284, the reference IVC pressure 288, the reference EVO pressure 292, and the reference EVC pressure 296. If the cylinder 114 is selected as the reference cylinder, the IVO pressure 252, the IVC pressure 260, the EVO pressure 268, and the EVC pressure 276 may be equal to the reference IVO pressure 284, the reference IVC pressure 288, the reference EVO pressure 292, and the reference EVC pressure 296, respectively. If another cylinder is selected as the reference cylinder, the reference IVO pressure 284, the reference IVC pressure 288, the reference EVO pressure 292, and the reference EVC pressure 296 may be equal to the IVO pressure, the IVC pressure, the EVO pressure, and the EVC pressure obtained for the other cylinder.

At 312, control generates the target IVO timing 216, the target IVC timing 220, the target EVO timing 224, and the target EVC timing 228 for the cylinder 114. Control may determine the target IVO timing 216, the target IVC timing 220, the target EVO timing 224, and the target EVC timing 228 to adjust the IVO pressure 252, the IVC pressure 260, the EVO pressure 268, and the EVC pressure 276 toward or to the reference IVO pressure 284, the reference IVC pressure 288, the reference EVO pressure 292, and the reference EVC pressure 296, respectively, during a next combustion cycle of the cylinder. For example, control may determine the target IVO timing 216, the target IVC timing 220, the target EVO timing 224, and the target EVC timing 228 based on a difference between the IVO pressure 252 and the reference IVO pressure 284, a difference between the IVC pressure 260 and the reference IVC pressure 288, a difference between the EVO pressure 268 and the reference EVO pressure 292, and a difference between the EVC pressure 276 and the reference EVC pressure 296.

Control opens the intake valve 118 of the cylinder 114 at the target IVO timing 216, control closes the intake valve 118 of the cylinder 114 at the target IVC timing 220, control opens the exhaust valve 126 of the cylinder 114 at the target EVO timing 224, and control closes the exhaust valve 126 of the cylinder 114 at the target EVC timing 228. Control controls opening and closing of the intake valve 118 at the target IVO timing 216 and the target IVC timing 220 via the intake valve actuator 130. Control controls opening and closing of the exhaust valve 126 at the target EVO timing 224 and the target EVC timing 228 via the exhaust valve actuator 132. While control is shown as ending after 312, as described above, control may perform FIG. 3 for each cylinder and for each combustion cycle.

Figure 4:
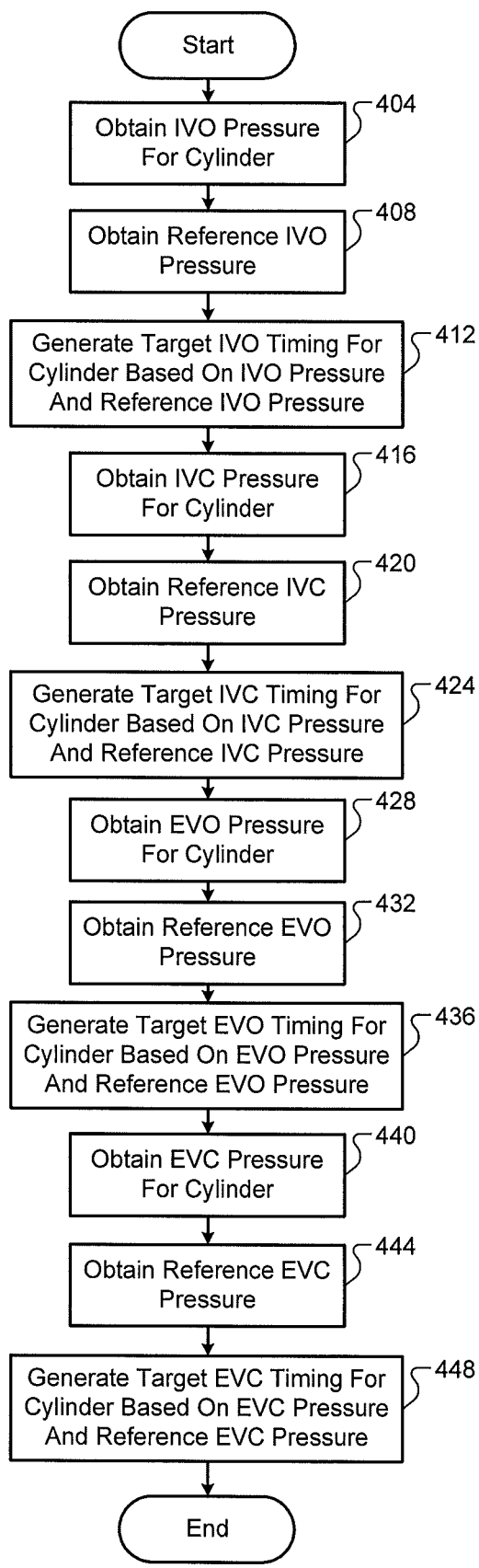
FIG. 4 is another flowchart depicting an example method of controlling intake and exhaust valve opening and closing timing using fully flexible valve actuation according to the present application.

Referring now to FIG. 4, another flowchart depicting an example method of controlling intake and exhaust valve opening and closing timing using fully flexible valve actuation is presented. Control may begin with 404 where control obtains the IVO pressure for a cylinder. For example, control may obtain the IVO pressure 252 for the cylinder 114. While FIG. 4 will be discussed in conjunction with the cylinder 114, control may perform the method of FIG. 4 for each other cylinder and for each combustion cycle. Control obtains the IVO pressure 252 from a measurement of the cylinder pressure sensor 150 taken after the IVO timing of the cylinder 114.

At 408, control obtains the reference IVO pressure 284. Control may generate the target IVO timing 216 for the cylinder 114 at 412. Control generates the target IVO timing 216 for the cylinder 114 based on a difference between the IVO pressure 252 and the reference IVO pressure 284. Control opens the intake valve 118 of the cylinder 114 at the target IVO timing 216 via the intake valve actuator 130.

At 416, control obtains the IVC pressure 260 for the cylinder 114. At 420, control obtains the reference IVC pressure 288. Control may generate the target IVC timing 220 for the cylinder 114 at 424. Control generates the target IVC timing 220 for the cylinder 114 based on a difference between the IVC pressure 260 and the reference IVC pressure 288. Control closes the intake valve 118 of the cylinder 114 at the target IVC timing 220 via the intake valve actuator 130.

Control obtains the EVO pressure 268 for the cylinder 114 at 428. At 432, control obtains the reference EVO pressure 292. Control may generate the target EVO timing 224 for the cylinder 114 at 436. Control generates the target EVO timing 224 for the cylinder 114 based on a difference between the EVO pressure 268 and the reference EVO pressure 292. Control opens the exhaust valve 126 of the cylinder 114 at the target EVO timing 224 via the exhaust valve actuator 132.

At 440, control obtains the EVC pressure 276 for the cylinder 114. At 444, control obtains the reference EVC pressure 296. Control may generate the target EVC timing 228 for the cylinder 114 at 448. Control generates the target EVC timing 228 for the cylinder 114 based on a difference between the EVC pressure 276 and the reference EVC pressure 296. Control closes the exhaust valve 126 of the cylinder 114 at the target EVC timing 228 via the exhaust valve actuator 132. While control is shown as ending after 448, as described above, control may perform FIG. 4 for each cylinder and for each combustion cycle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A control system for an engine, comprising:
an intake valve actuator that opens an intake valve of a cylinder at a first target opening timing during a first combustion cycle of the cylinder;
a cylinder pressure module that receives a cylinder pressure measured by a cylinder pressure sensor of the cylinder and that, at a predetermined crankshaft angle after the intake valve opens during the first combustion cycle, sets a valve opening pressure equal to the cylinder pressure; and
a valve control module that receives a reference cylinder pressure and that generates a second target opening timing for a second combustion cycle of the cylinder based on the valve opening pressure and the reference cylinder pressure, wherein the second combustion cycle is after the first combustion cycle, and wherein, during the second combustion cycle, the intake valve actuator opens the intake valve at the second target opening timing.

2. The control system of claim 1 wherein the valve control module determines the second target opening timing for the intake valve based on a difference between the valve opening pressure and the reference cylinder pressure.

3. The control system of claim 2 wherein the valve control module:
determines a desired opening timing for the intake valve; and
selectively adjusts the desired opening timing based on the difference to generate the second target opening timing.

4. The control system of claim 3 wherein the valve control module:
determines a timing adjustment as a function of the difference; and
selectively one of advances and retards the desired opening timing by the timing adjustment to generate the second target opening timing.

5. The control system of claim 3 wherein the valve control module:
determines a timing adjustment as a function of the difference; and
sets the second target opening timing equal to a sum of the desired opening timing and the timing adjustment.

6. The control system of claim 1 wherein:
during the first combustion cycle, the intake valve actuator closes the intake valve at a first target closing timing;
the cylinder pressure module, at a second predetermined crankshaft angle after the intake valve closes during the first combustion cycle, sets a valve closing pressure equal to the cylinder pressure;
the valve control module receives a second reference cylinder pressure, generates a second target closing timing for the intake valve based on the valve closing pressure and the second reference cylinder pressure; and
during the second combustion cycle, the intake valve actuator closes the intake valve at the second target closing timing.

7. The control system of claim 6 wherein the valve control module:
determines a desired closing timing for the intake valve;
determines a second difference between the valve closing pressure and the second reference cylinder pressure; and
selectively adjusts the desired closing timing based on the second difference to generate the second target closing timing.

8. The control system of claim 7 wherein the valve control module:
determines a second timing adjustment as a function of the second difference; and
sets the second target closing timing equal to a sum of the desired closing timing and the second timing adjustment.

9. The control system of claim 6 further comprising a reference pressure module that:
selectively sets the reference cylinder pressure equal to a second cylinder pressure measured by a second cylinder pressure sensor of a second cylinder at the predetermined crankshaft angle after an intake valve of the second cylinder opens; and
selectively sets the second reference cylinder pressure equal to the second cylinder pressure at the second predetermined crankshaft angle after the intake valve of the second cylinder closes.

10. The control system of claim 9 wherein the cylinder and the second cylinder are different cylinders.

11. A control system for an engine, comprising:
an exhaust valve actuator that opens an exhaust valve of a cylinder at a first target opening timing during a first combustion cycle of the cylinder;
a cylinder pressure module that receives a cylinder pressure measured by a cylinder pressure sensor of the cylinder and that, at a predetermined crankshaft angle after the exhaust valve opens during the first combustion cycle, sets a valve opening pressure equal to the cylinder pressure; and
a valve control module that receives a reference cylinder pressure and that generates a second target opening timing for a second combustion cycle of the cylinder based on the valve opening pressure and the reference cylinder pressure,
wherein the second combustion cycle is after the first combustion cycle, and
wherein, during the second combustion cycle, the exhaust valve actuator opens the exhaust valve at the second target opening timing.

12. The control system of claim 11 wherein the valve control module determines the second target opening timing for the exhaust valve based on a difference between the valve opening pressure and the reference cylinder pressure.

13. The control system of claim 12 wherein the valve control module:
determines a desired opening timing for the exhaust valve; and
selectively adjusts the desired opening timing based on the difference to generate the second target opening timing.

14. The control system of claim 13 wherein the valve control module:
determines a timing adjustment as a function of the difference; and
selectively one of advances and retards the desired opening timing by the timing adjustment to generate the second target opening timing.

15. The control system of claim 13 wherein the valve control module:
determines a timing adjustment as a function of the difference; and
sets the second target opening timing equal to a sum of the desired opening timing and the timing adjustment.

16. The control system of claim 11 wherein:
during the first combustion cycle, the exhaust valve actuator closes the exhaust valve at a first target closing timing;
the cylinder pressure module, at a second predetermined crankshaft angle after the exhaust valve closes during the first combustion cycle, sets a valve closing pressure equal to the cylinder pressure;
the valve control module receives a second reference cylinder pressure, generates a second target closing timing for the exhaust valve based on the valve closing pressure and the second reference cylinder pressure; and
the exhaust valve actuator closes the exhaust valve at the second target closing timing during the second combustion cycle.

17. The control system of claim 16 further comprising a reference pressure module that:
  selectively sets the reference cylinder pressure equal to a second cylinder pressure measured by a second cylinder pressure sensor of a second cylinder at the predetermined crankshaft angle after an exhaust valve of the second cylinder opens; and
  selectively sets the second reference cylinder pressure equal to the second cylinder pressure at the second predetermined crankshaft angle after the exhaust valve of the second cylinder closes.

18. The control system of claim 17 wherein the cylinder and the second cylinder are different cylinders.

19. The control system of claim 17 wherein the cylinder and the second cylinder are the same cylinder.

20. The control system of claim 16 further comprising:
  an intake valve actuator that, during the first combustion cycle, opens an intake valve of the cylinder at a third target opening timing and closes the intake valve at a third target closing timing,
  wherein:
    the cylinder pressure module:
      at a third predetermined crankshaft angle after the intake valve of the cylinder opens during the first combustion cycle, sets a second valve opening pressure equal to the cylinder pressure; and,
      at a fourth predetermined crankshaft angle the intake valve of the cylinder closes during the first combustion cycle, sets a second valve closing pressure equal to the cylinder pressure;
    the valve control module:
      receives a third reference cylinder pressure and a fourth reference cylinder pressure;
      generates a fourth target opening timing for the intake valve based on the second valve opening pressure and the third reference cylinder pressure; and
      generates a fourth target closing timing for the intake valve based on the second valve closing pressure and the fourth reference cylinder pressure; and,
    during the second combustion cycle, the intake valve actuator:
      opens the intake valve at the fourth target opening timing; and
      closes the intake valve at the fourth target closing timing.

* * * * *

UNITED STATES PATENT AND TRADEMARK OFFICE
CERTIFICATE OF CORRECTION

PATENT NO. : 9,127,601 B2  
APPLICATION NO. : 13/568624  
DATED : September 8, 2015  
INVENTOR(S) : Cowgill et al.

Page 1 of 1

It is certified that error appears in the above-identified patent and that said Letters Patent is hereby corrected as shown below:

Title Page, Item [73], insert
--GM Global Technology Operations LLC, Detroit, MI (US)--

Signed and Sealed this
Twenty-fourth Day of May, 2016

Michelle K. Lee
*Director of the United States Patent and Trademark Office*